(12) United States Patent
Hammerschmidt et al.

(10) Patent No.: US 8,194,771 B2
(45) Date of Patent: Jun. 5, 2012

(54) TRANSMISSION METHOD AND APPARATUS IN A MULTIPLE ANTENNA COMMUNICATION SYSTEM

(75) Inventors: Joachim S. Hammerschmidt, Mountain View, CA (US); Robert John Kopmeiners, Hengelo (NL); Xiaowen Wang, Bridgewater, NJ (US)

(73) Assignee: Agere Systems Inc., Allentown, PA (US)

( * ) Notice: Subject to any disclaimer, the term of this patent is extended or adjusted under 35 U.S.C. 154(b) by 1065 days.

(21) Appl. No.: 10/990,143

(22) Filed: Nov. 16, 2004

(65) Prior Publication Data

US 2005/0163236 A1   Jul. 28, 2005

Related U.S. Application Data

(60) Provisional application No. 60/539,699, filed on Jan. 27, 2004.

(51) Int. Cl.
*H04B 7/02* (2006.01)
(52) U.S. Cl. ........ 375/267; 375/260; 375/299; 455/101; 455/132; 455/296; 455/500; 455/562.1; 370/334
(58) Field of Classification Search .................. 375/260, 375/267, 299, 347; 370/206, 208, 210, 334; 455/500, 101, 132, 296, 562.1
See application file for complete search history.

(56) References Cited

U.S. PATENT DOCUMENTS

| | | | | |
|---|---|---|---|---|
| 6,842,487 B1 * | 1/2005 | Larsson | .......... | 375/260 |
| 7,065,156 B1 * | 6/2006 | Kuchi | .......... | 375/299 |
| 7,082,159 B2 * | 7/2006 | Larsson | .......... | 375/224 |
| 7,103,115 B2 * | 9/2006 | Li | .......... | 375/340 |
| 7,453,793 B1 * | 11/2008 | Jones et al. | .......... | 370/203 |
| 7,606,316 B1 * | 10/2009 | Narasimhan | .......... | 375/260 |
| 2002/0003774 A1 | 1/2002 | Wang et al. | | |
| 2002/0122381 A1 | 9/2002 | Wu et al. | .......... | 370/208 |
| 2003/0072255 A1 | 4/2003 | Ma et al. | .......... | 370/208 |
| 2005/0233709 A1 * | 10/2005 | Gardner et al. | .......... | 455/101 |

(Continued)

FOREIGN PATENT DOCUMENTS

WO   WO 02/25857 A1   3/2002

OTHER PUBLICATIONS

"Principles of Communication Systems" by Herbert Taub pp. 30-31 1986.*

(Continued)

*Primary Examiner* — Leon Flores

(74) *Attorney, Agent, or Firm* — Ryan, Mason & Lewis, LLP

(57) ABSTRACT

A method and apparatus are disclosed for transmitting symbols in a multiple antenna communication system. The disclosed frame structure comprises a preamble having a plurality of long training symbols that are transmitted on a plurality transmit antennas. At least a portion of the frame is delayed on at least one transmit antenna. The disclosed frame formats of the present invention are backwards compatible to existing single antenna communication systems. The delay amount, D, can be approximately equal to one OFDM time sample period, T. The delayed version can be obtained by introducing a time delay into a signal on the delayed branch(es) or by cyclically shifting at least a portion of each frame on the delayed branch(es). The entire frame or only the preamble portion of each frame can be delayed.

19 Claims, 13 Drawing Sheets

U.S. PATENT DOCUMENTS

2007/0060073 A1 * 3/2007 Boer et al. .................. 455/101

OTHER PUBLICATIONS

Barhumi et al., "Optimal Training Design for MIMO OFDM Systems in Mobile Wireless Channels," IEEE Transactions of Signal Processing, vol. 51, No. 6, pp. 1615-1624 (Jun. 6, 2003).

Darnmann et al., "Standard Conformable Antenna Diversity Techniques for OFDM and its Application to the DVB-T System," IEEE Xplore, pp. 3100-3105 (2001).

Huebner et al., "A Simple Space-Frequency Coding Scheme with Cyclic Delay Diversity for OFDM," IEEE Xplore, pp. 106-110 (2003).

* cited by examiner

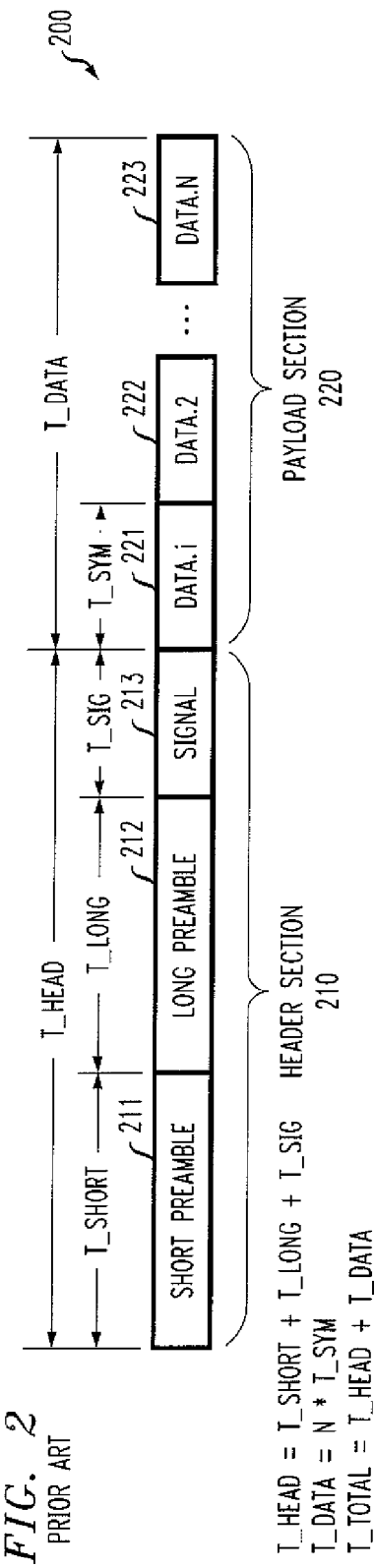
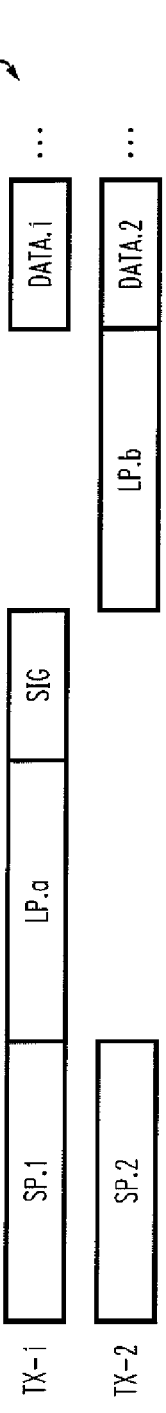
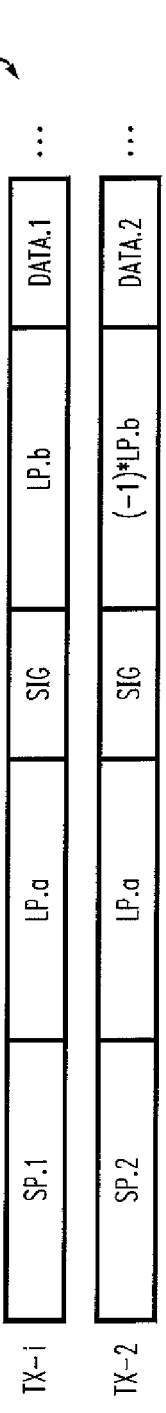
FIG. 2
PRIOR ART
FIG. 3A
FIG. 3B

LP SEGMENT
LP.a

LP SEGMENT
LP.b

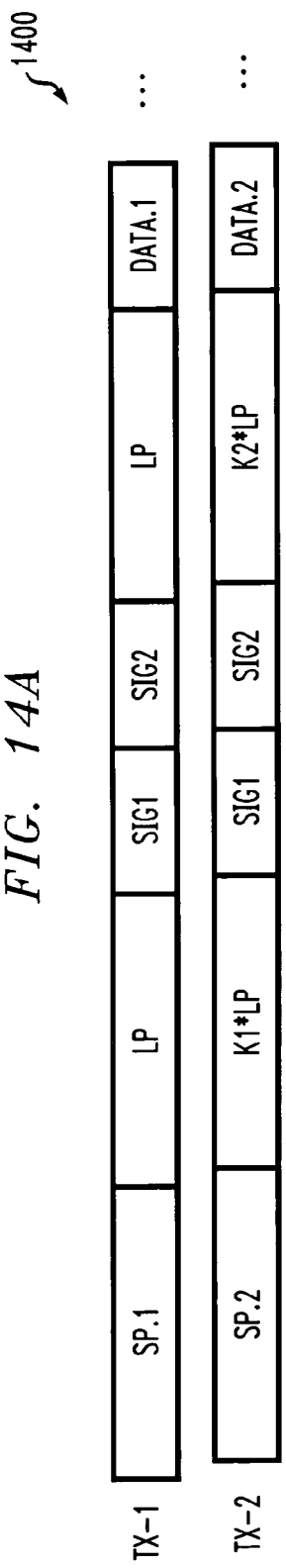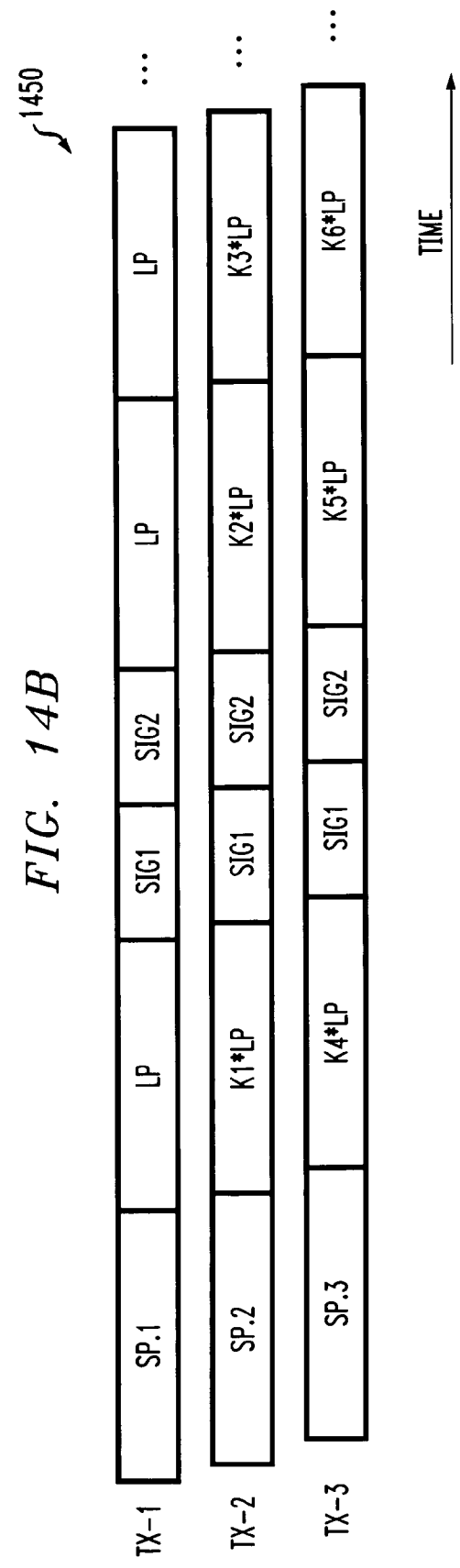
FIG. 14A
FIG. 14B

TRANSMISSION METHOD AND APPARATUS IN A MULTIPLE ANTENNA COMMUNICATION SYSTEM

CROSS-REFERENCE TO RELATED APPLICATIONS

The present application claims priority to U.S. Provisional Patent Application Ser. No. 60/539,699, filed Jan. 27, 2004, incorporated by reference herein.

FIELD OF THE INVENTION

The present invention relates generally to transmission techniques for a wireless communication system, and more particularly, to channel estimation and training techniques for a multiple antenna communication system.

BACKGROUND OF THE INVENTION

Multiple transmit and receive antennas have been proposed to provide both increased robustness and capacity in next generation Wireless Local Area Network (WLAN) systems. The increased robustness can be achieved through techniques that exploit the spatial diversity and antenna gain introduced in a system with multiple antennas. The increased capacity can be achieved in multipath fading environments with bandwidth efficient Multiple Input Multiple Output (MIMO) techniques. A multiple antenna communication system increases the data rate in a given channel bandwidth by transmitting separate data streams on multiple transmit antennas. Each receiver receives a combination of these data streams on multiple receive antennas.

In order to properly receive the different data streams, receivers in a multiple antenna communication system must acquire a channel matrix through training. This is often achieved by using a specific training symbol, or preamble, to perform synchronization and channel estimation techniques. It is desirable for the multiple antenna communication system to co-exist with legacy single antenna communications systems (typically referred to as Single Input Single Output (SISO) systems) Thus, a legacy (single antenna) communications system must be able to interpret the preambles that are transmitted by multiple antenna communication systems. Most legacy Wireless Local Area Network (WLAN) systems based upon OFDM modulation comply with either the IEEE 802.11a or IEEE 802.11g standards (hereinafter "IEEE 802.11a/g"). Generally, the preamble signal seen by the legacy device should allow for an accurate synchronization and channel estimate for the part of the packet that the legacy device needs to understand.

A number of frame formats have been proposed for evolving multiple antenna communication systems, such as MIMO-OFDM systems. In one proposed frame format, the MIMO preamble is extended to include at least one long training symbol for each transmit antenna, and each transmit antenna sequentially transmits one or more long training symbols, such that only transmit antenna is active at a time. As the transmit antennas are switched on and off, the temperature of the corresponding power amplifier will increase and decrease, respectively. Generally, such heating and cooling of the power amplifier will lead to "breathing" effects that cause the transmitted signal to have a phase or magnitude offset, relative to the desired signal. It is therefore desirable to have a continuous transmission from all transmitters once the packet transmission has started to avoid temperature related signal "breathing."

In a frame format that continuously transmits signals from all transmit branches, the same long training symbol is typically transmitted by all transmit antennas at the same time (possibly multiplied by a constant value). This scheme, however, may lead to a beamforming phenomenon if the transmitter is not surrounded by many scattering objects. In other words, when multiple antennas transmit the same signal (possible differing by a constant factor), then certain areas in the environment will be better illuminated than others. Depending on the constant factor between the various transmit antennas, these illumination areas will change.

A need therefore exists for a method and system for performing channel estimation and training in a MIMO-OFDM system that is compatible with current IEEE 802.11a/g standard (SISO) systems, allowing MIMO-OFDM based WLAN systems to efficiently co-exist with SISO systems. A further need exists for a method and system for performing channel estimation and training in a MIMO-OFDM system that does not cause beamforming effects.

SUMMARY OF THE INVENTION

Generally, a method and apparatus are disclosed for transmitting symbols in a multiple antenna communication system. The disclosed frame structure comprises a preamble having a plurality of long training symbols that are transmitted on a plurality transmit antennas. According to one aspect of the invention, at least a portion of the frame is delayed on at least one transmit antenna. According to a further aspect of the invention, the preamble portion of each said frame can be processed by a single antenna communication system. Thus, the disclosed frame formats of the present invention are backwards compatible to existing single antenna communication systems.

In an exemplary multiple antenna communication system having two transmit branches, at least a portion of a frame is transmitted on a first transmit antenna; and a delayed version of at least a portion of the frame is transmitted on a second transmit antenna. Further delays are employed on each transmit branch for higher order multiple antenna communication systems. The delay amount, D, can be approximately equal to one OFDM time sample period, T.

The delayed version can be obtained by introducing a time delay into a signal on the delayed branch(es) or by cyclically shifting at least a portion of each frame on the delayed branch(es). In one implementation, the entire frame is delayed. In a further variation, only the preamble portion of each frame is delayed and the data portion of each frame is time aligned on each transmit antenna.

A more complete understanding of the present invention, as well as further features and advantages of the present invention, will be obtained by reference to the following detailed description and drawings.

BRIEF DESCRIPTION OF THE DRAWINGS

FIG. 2 illustrates a frame format for a conventional SISO OFDM system;

FIGS. 3A and 3B illustrate exemplary frame formats for a MIMO OFDM system that provide backwards compatability for an exemplary implementation having two transmit antennas TX-1 and TX-2;

FIGS. 14A and 14B illustrate frame formats where a second signal field SIG2 is found after the first signal field SIG1;

DETAILED DESCRIPTION

Figure 1:
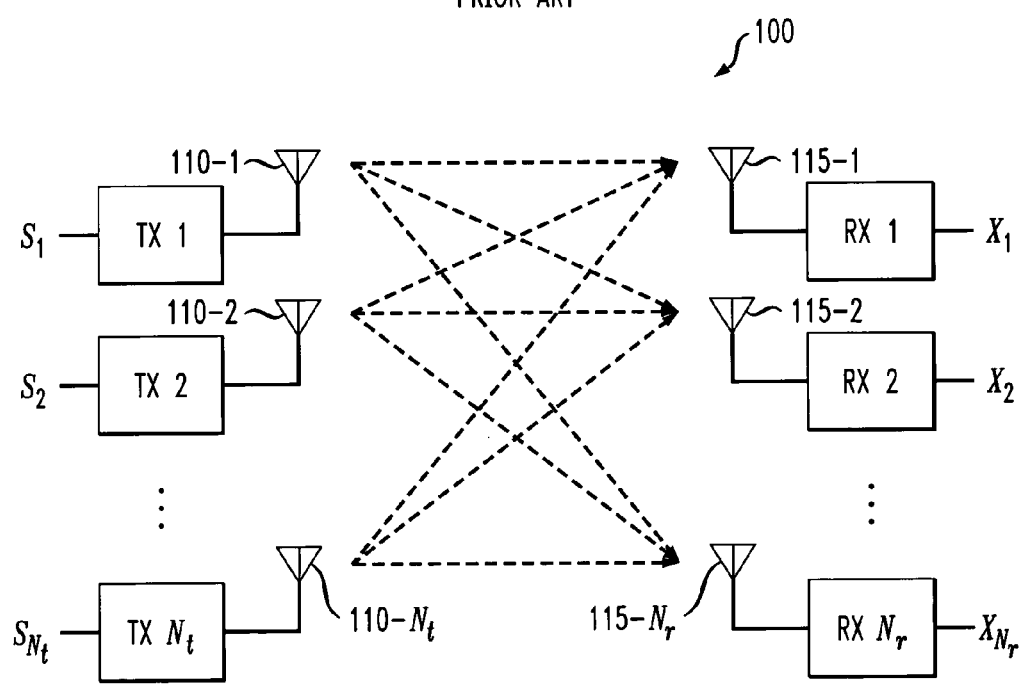
FIG. 1 illustrates an exemplary conventional MIMO-OFDM environment in which the present invention can operate.

FIG. 1 illustrates an exemplary conventional MIMO-OFDM environment in which the present invention can operate. As shown in FIG. 1, an exemplary conventional MIMO-OFDM system 100 comprises source signals $S_1$ to $S_{N_t}$, transmitters $TX_1$ to $TX_{N_t}$, transmit antennas 110-1 through 110-$N_t$, receive antennas 115-1 through 115-$N_r$, and receivers $RX_1$ to $RX_{N_r}$. The MIMO-OFDM system 100 transmits separate data streams on the multiple transmit antennas 110, and each receiver RX receives a combination of these data streams.

As used herein, the term "SISO" shall mean a system that transmits a single data stream ("signal layer") into a channel. The term "SISO" may include a system that employs two transmit antennas that transmit essentially the same signal, for example, in a beamforming or transmit diversity type of configuration; and a system that employs multiple receive antennas (such as in a receive diversity/beamforming type of configuration). In addition, the term SISO may be used to describe a system with a single transmitter but multiple receive antennas. Thus, in our terminology, the term "SISO" captures all systems that have a single transmit layer in the same channel bandwidth, regardless of how the signal is actually generated and regardless of how the receiver "samples" the wireless medium with one or several receive antennas. Similarly, as used herein, the term "MIMO" shall mean a system in which there are multiple transmission layers, i.e., several distinguishable streams are transmitted from different antennas into the same frequency channel. It is noted that there could be one or more receive antennas in various configurations to receive such a MIMO transmission. In typical implementations for rate enhancement, there will be as many receive antennas as transmit antennas, or more receive antennas than transmit antennas.

FIG. 2 illustrates a frame format 200 for a conventional SISO OFDM system. As shown in FIG. 2, the frame format 200 includes a header section 210 and a payload section 220. The header section 210 includes a "Short Preamble" period 211, a "Long Preamble period 212 and a signal field 213. The short preamble period 211 is generally 8 microseconds long, consisting of 10 Short Preamble symbols in the exemplary 802.11 g/a system. The short preamble period 211 is used by a receiver to detect that there is a packet coming in and to adjust the Automatic Gain Control in the radio circuit. The "Long Preamble" period 212 generally contains two Long Preamble symbols in the exemplary 802.11 g/a system. The long preamble period 212 is used by a receiver to estimate various parameters, such as channel estimation, frequency offset and timing synchronization. The signal field 213 contains information of the physical layer properties of the frame, for example, to indicate the data rate and packet length to the receiver. The payload section 220 carries the actual information useful to the MAC layer As shown in FIG. 2, the overall duration of transmitting a packet is given by the addition of the header duration T_head plus the data duration T_data.

FIGS. 3A and 3B illustrate exemplary frame formats 300, 350 for a MIMO OFDM system that provide backwards compatibility for an exemplary implementation having two transmit antennas TX-1 and TX-2. In the examples of FIGS. 3A and 3B, the first row shows the signal transmitted from the first transmit antenna TX-1, whereas the second row is the signal transmitted from the second transmit antenna TX-2. As shown in FIG. 3A, for example, the frame format 300 includes the MIMO Short Preamble SP.1, SP.2 transmitted simultaneously from both antennas TX-1 and TX-2. Thereafter, a first Long Preamble sequence LP.a is transmitted from the first antenna, while the second antenna (TX-2) does not transmit any signal. The second transmitter (TX-2) then transmits a Long Preamble Sequence LP.b while the first antenna TX-1 does not transmit any signal.

As previously indicated, it is desirable to have a continuous transmission from all transmitters once the packet transmission has started, in order to avoid heating/cooling related signal "breathing," potentially leading to synchronization and detection errors at the receiver. In the frame format of FIG. 3A, after transmitting the short preamble SP.2, the power amplifier of the second antenna branch TX-2 will be switched off, and might therefore cool down after achieving a certain temperature during the transmission of SP.2. The power amplifier of TX-2 will then have to be switched on again for transmission of the long preamble LP.b, and the temperature of the amplifier will increase again, while at the same time, the power amplifier of the first antenna TX-1 will be switched off and will cool down. Generally, heating and cooling leads to "breathing" effects. In other words, the transmitted signal might have slight offsets (in phase or magnitude) from the desired signal. Moreover, due to possible temperature drifts during the preamble, these offsets will change over time.

It is, therefore, more desirable to continuously transmit signals from all transmit branches. One example for a frame format 350 with continuous transmissions is shown in FIG. 3B. As shown in FIG. 3B, the long preamble segment LP.a is transmitted identically from both antennas TX-1 and TX-2, while in the second long preamble segment LP.b, the signal on the second antenna TX-2 is inverted (e.g., transmitted after pre-multiplying all samples by −1). This scheme, however, may lead to a beamforming phenomenon, discussed below, whenever the transmitter is not surrounded by many scattering objects. A typical wireless Access Point, for example, will typically be mounted high above the ground in an office environment and as such away from many scattering objects.

Figure 4:
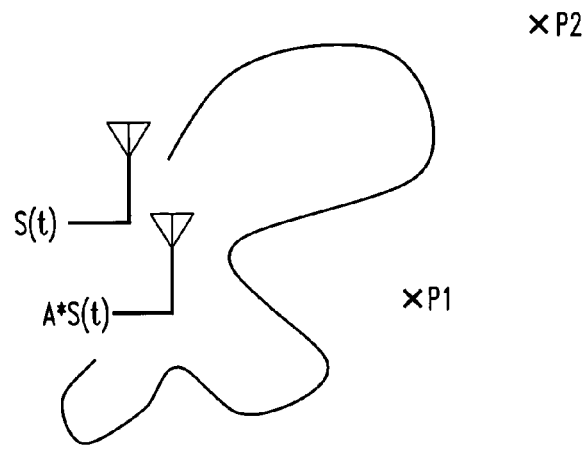
FIG. 4 illustrates a beamforming effect that results from the simultaneous transmission of the same symbol from two or more transmit branches in a multiple antenna communication system.

The resulting beamforming effect is shown in FIG. 4. If two antennas transmit the same signal (possible differing by any constant factor, shown as a factor A in FIG. 4), then certain areas in the environment will be better illuminated, such as point P2, than other areas, such as point P1. Depending on the constant factor, A, between the two transmitters, these illumination areas will change. For instance, for the frame format 350 of FIG. 3B, the factor between the two antenna branches during the long preamble LP.a is +1, while for long preamble LP.b the factor is (−1). However, since in an ideal environment the illumination is omnidirectional and temporally constant for reliable coverage, such (time-variant) beamforming effects are generally undesired.

Moreover, transmission of essentially (apart from a constant factor between the TX antennas) the same signal from several antennas during the Short Preamble will lead to erroneous receive power estimates in the power estimation. This is due to the fact that when essentially the same signal is transmitted from several antennas, there will be a coherent addition of physical channels, while the omnidirectionally radiated (and uncorrelated) MIMO samples in the data portion lead to a power addition. The result is suboptimally adjusted gain settings in the analog amplifier stage (AGC settings), which leads to either increased effective noise levels and/or more distortion.

Figure 5A:
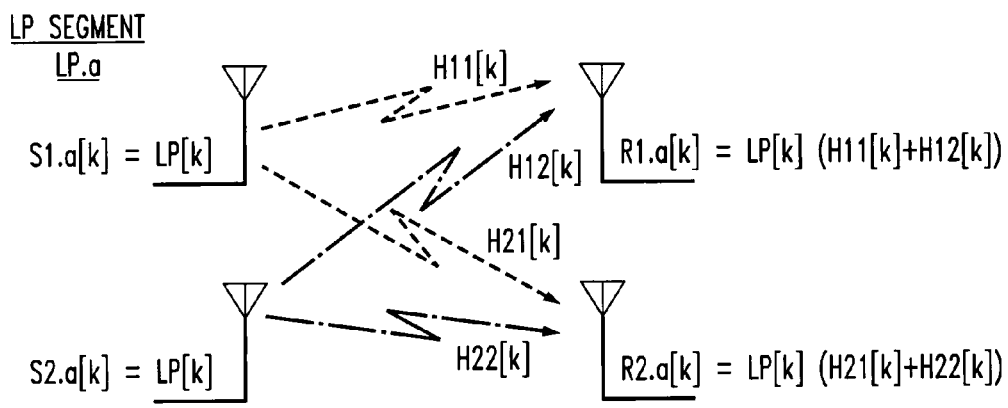
FIGS. 5A and 5B illustrates the transmission of the two long preamble segments LP.a and LP.b, respectively, along with the corresponding channel coefficients and receive signals, for the preamble scheme of FIG. 3A.
Figure 5B:
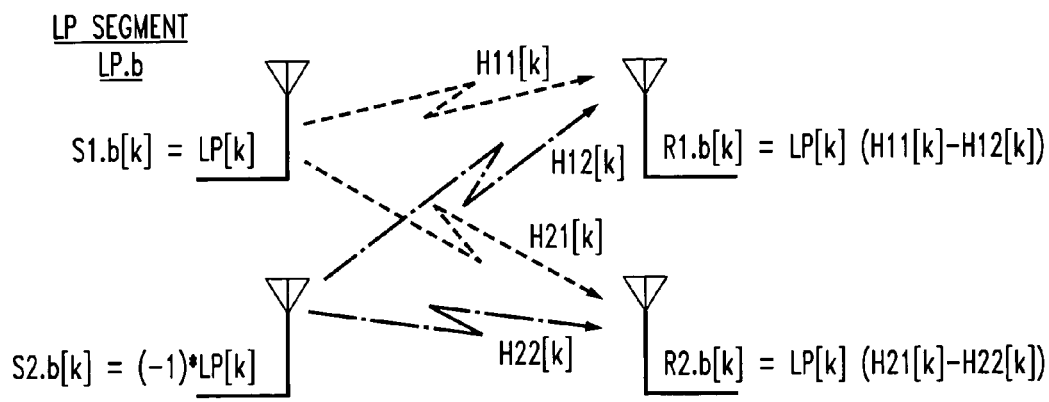

FIGS. 5A and 5B illustrates the transmission of the two long preamble segments LP a and LP b, respectively, along with the corresponding channel coefficients and receive signals, for the frame format 300 of FIG. 3A. It is noted that any noise contributions that will occur are not shown in FIGS. 5A and 5B, for ease of illustration. Thus, the channel coefficient for the first receiver for long preamble LP a, as shown in FIG. 5A, is given by:

$$R1a\{k\}=LP\{k\}(H11\{k\}+H12\{k\}),$$

and the channel coefficient for the second receiver for long preamble LP a is given by:

$$R2a\{k\}=LP\{k\}(H21\{k\}+H22\{k\})$$

Likewise, the channel coefficient for the first receiver for long preamble LP.b, as shown in FIG. 5B, is given by:

$$R1.b\{k\}=LP\{k\}(H11\{k\}-H12\{k\}),$$

and the channel coefficient for the second receiver for long preamble LP.b is given by:

$$R2.b\{k\}=LP\{k\}(H21\{k\}-H22\}k\}).$$

Figure 6:
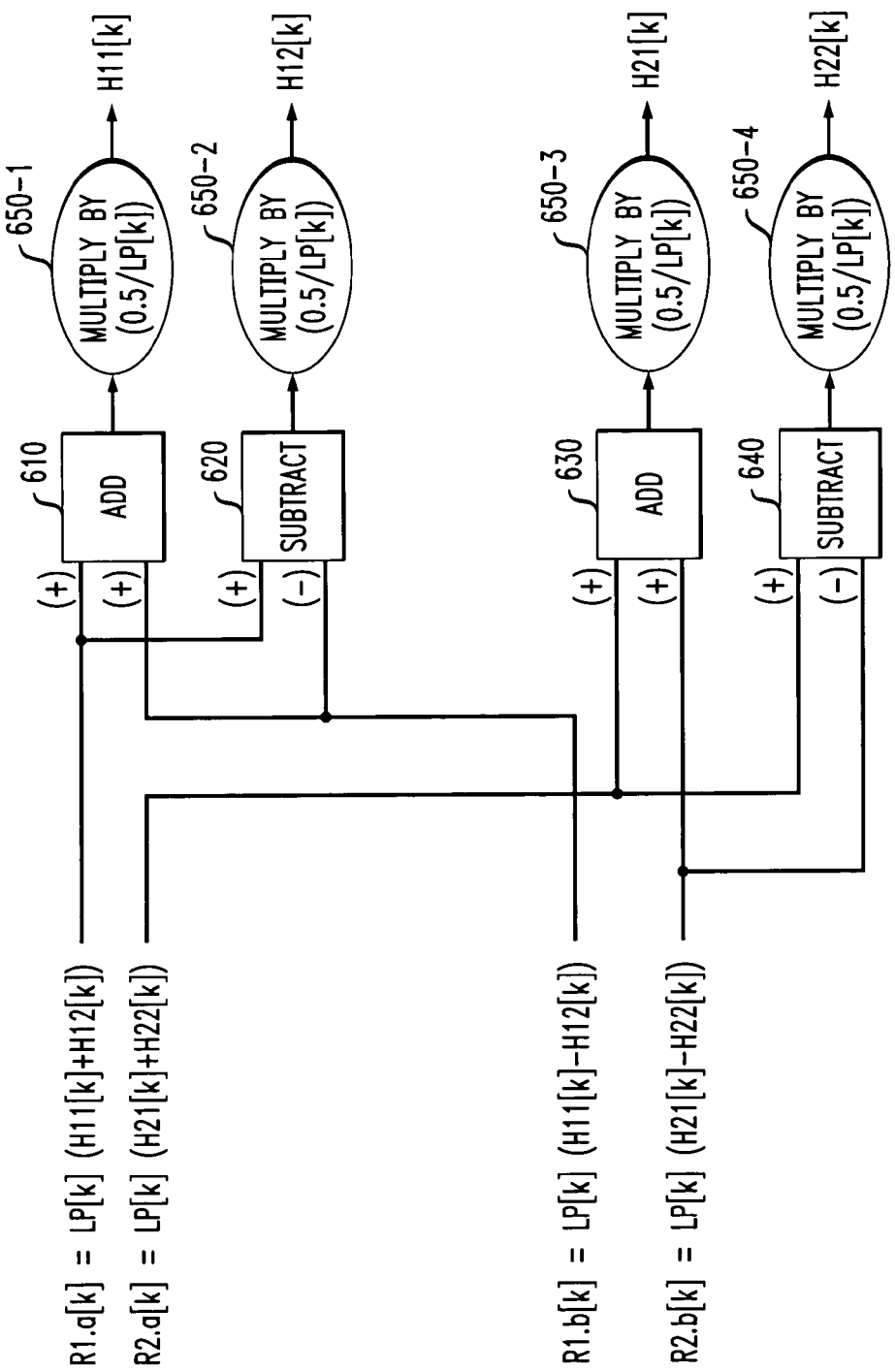
FIG. 6 illustrates a channel estimation structure that can further process the signals of FIG. 5 to produce the desired channel coefficients.

FIG. 6 illustrates a channel estimation structure 600 that can further process the signals of FIG. 5 to produce the desired channel coefficients. Thus, the output of the channel estimation structure 600 is the desired channel coefficients (for an exemplary 2×2 MIMO system). The channel estimation structure 600 processes the R signals of FIG. 5 using a number of adders 610, 630, and subtractors 620, 640, followed by a multiplication stage 650, to produce the channel coefficients, H. It is noted that noise contributions would be added to each coefficient, such that the estimate would not be completely identical to the actual coefficient, leading to some degradation.

According to one aspect of the present invention, a frame format is selected that continuously transmits from all transmit branches, such as the frame format 350 of FIG. 3B, and the overall frame (preamble and data sections of the packet) transmitted from the second antenna is delayed or otherwise shifted before transmission. A typical delay is given, for example, by one OFDM sample period, such as 50 nanoseconds in the IEEE 802.11a/g standards. In one variation, the sampled data stream on one or more transmit antennas can be constructed by performing cyclic OFDM rotations by the same delay amount, D. For example, on an OFDM symbol-by-symbol basis, time-domain samples are moved from the end of each symbol to the beginning of the symbol.

Figure 7:
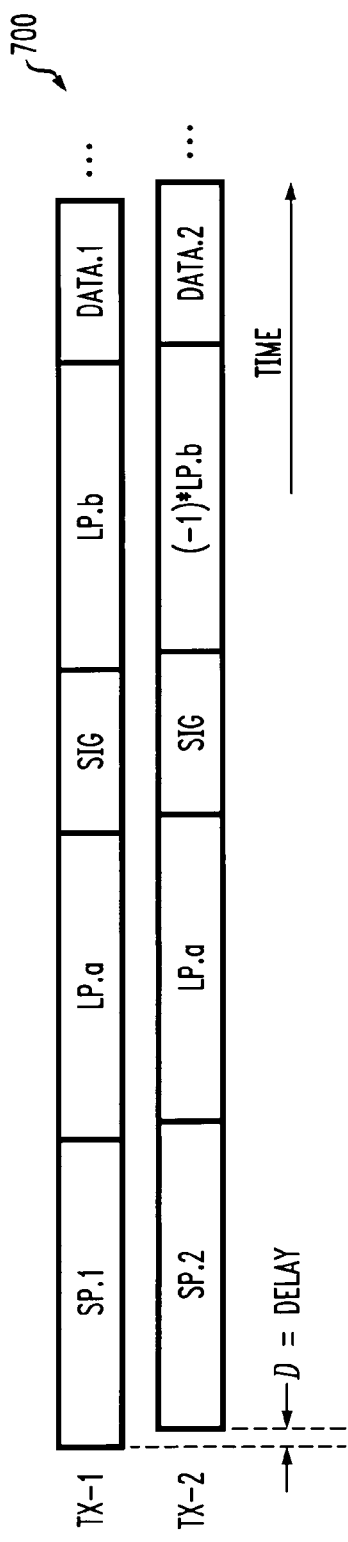
FIG. 7 illustrates a frame format incorporating features of the present invention for an exemplary implementation having two transmit antennas.

FIG. 7 illustrates a frame format 700 incorporating features of the present invention for an exemplary implementation having two transmit antennas. As shown in FIG. 7, the exemplary frame format 700 is based on the frame format 350 of FIG. 3B, wherein the transmission of the frame by the second transmitter TX-2 is delayed by an amount D. The delay, D, should be matched to the auto-correlation function of the respective (Short and Long) preambles, such that the auto-correlation value is low for the value of delay D compared to the main peak. For the formats and correlation properties of the Preamble sequences given in IEEE 802.11a/g OFDM, a short delay D is advisable.

One promising example would be for the delay D to correspond to one OFDM time sample period T. In 802.11a/g OFDM, this number is 50 nanoseconds. For a general OFDM system, the OFDM time sample period is given by the inverse of the frequency spacing of two adjacent subcarriers, divided by the maximum number of OFDM subcarriers captured by the FFT. In 802.11a/g, for example, these numbers are 312.5 KHz spacing and 64 subcarriers, where only 52 subcarriers are non-empty. However, a period of 0.5 T, 1.5 T or 2 T can be used in practice, as well. The advantage of using the delay D lies in the fact that during the preamble, from a standpoint of the effective transmit beampattern at any given time instant, the two antennas will no longer simultaneously transmit the same sequence. This randomizes the radiation and appears as an overlay of two independent, thus essentially omnidirectional signal streams. Using delays D smaller than T leads to partially correlated transmission, which may cause some limited beampattern effect for certain propagation environments.

Among other benefits, the delayed transmission of the frame by the second transmitter allows continuous transmission from both antennas without the heating/cooling phenomena that might cause the signal to "breathe" and thus impair the transmission reliability.

Figure 8:
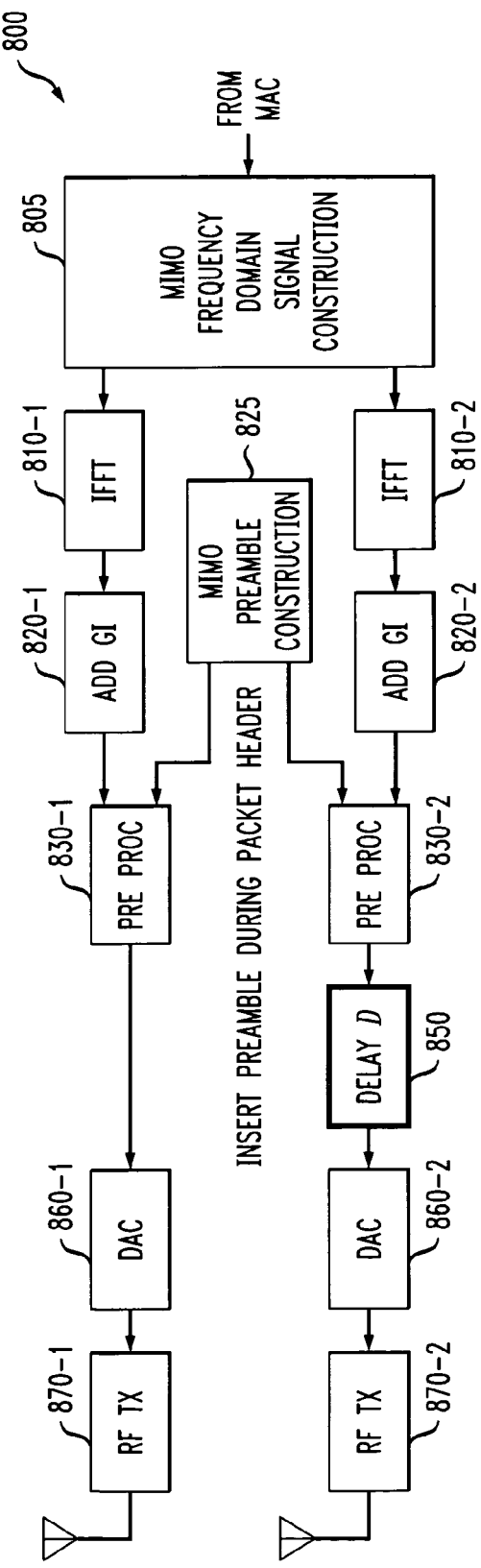
FIG. 8 is a schematic block diagram of a transmitter incorporating features of the present invention.

FIG. 8 is a schematic block diagram of a transmitter 800 incorporating features of the present invention. As shown in FIG. 8, data to be transmitted is received from the MAC layer and the signal is constructed in the frequency domain at stage 805, such as signal encoding and modulation. Thereafter, an inverse fast Fourier transform is performed at stage 810 and a guard interval is added at stage 820. The MIMO preamble is constructed at stage 825 and combined with the data signal at stage 830. The flame for the second transmitter is delayed in accordance with the present invention at delay element 850. The digital signal is converted to an analog signal at stage 860 and transmitted at stage 870.

Thus, a delay element 850 is introduced at the end of the digital signal processing chain in the second antenna branch TX-2, before the signal is converted to analog and forwarded to the RF stage. It is important to note that in the exemplary embodiment this delay is applied across the whole packet including all data symbols, i.e., this delay is not limited to the preamble section of the frame. Also note that the channel estimation in the frequency domain has not changed.

Figure 9:
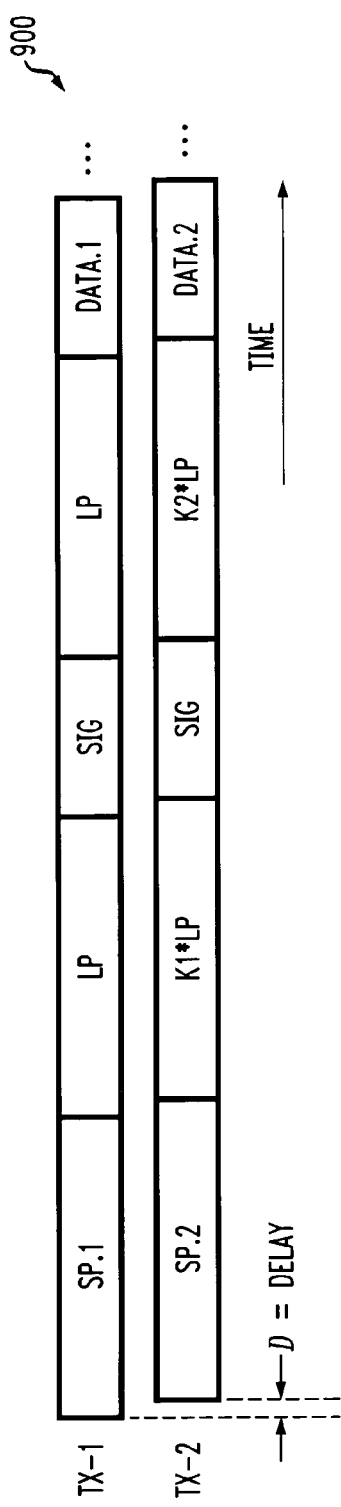
FIG. 9 illustrates a frame format incorporating features of the present invention that is a generalization of the preamble format of FIG. 7.

FIG. 9 illustrates a frame format 900 incorporating features of the present invention that is a generalization of the preamble format 700 of FIG. 7. As shown in FIG. 9, two parameters K1 and K2 are specified. The parameters K1 and K2 can generally take any convenient values that allow for a reconstruction (separation) of the channel coefficients using the procedure described above. In the specific implementation shown in FIG. 9, the parameter K1 equals 1 and the parameter K2 equals −1.

Figure 10:
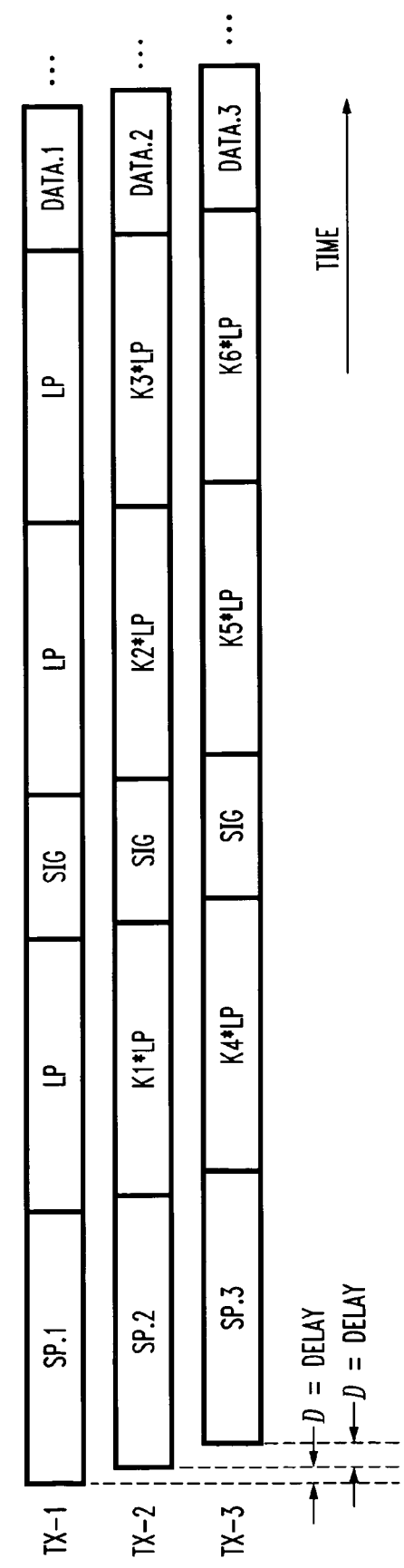
FIG. 10 illustrates a frame format incorporating features of the present invention for an exemplary multiple antenna communication system having three transmit antennas.

FIG. 10 illustrates a frame format 1000 incorporating features of the present invention for an exemplary multiple antenna communication system having three transmit antennas. As shown in FIG. 10, the second antenna TX-2 is delayed from the first antenna TX-1, and the third antenna TX-3 is further delayed.

Using these parameters, it is ensured that each transmit antenna transmits the same power at any time (magnitude of all Ks is 1.0), and that the receiver can separate the channel coefficients in a multi-dimensional manner. The delay D would typically correspond to T or 0.5 T in this implementation. For example, the K coefficients can have the following exemplary values:

$$K1=K4=1;$$

$$K2=K6=\exp(-j*120 \text{ deg}); \text{ and}$$

$$K3=K5=\exp(+j*120 \text{ deg}).$$

The short preambles SP.1 to SP.3 could follow any suitable well-known or MIMO-specific short preamble format. For example, SP.1 to SP.3 could all follow the 802.11 a/g OFDM standard.

Figure 11:
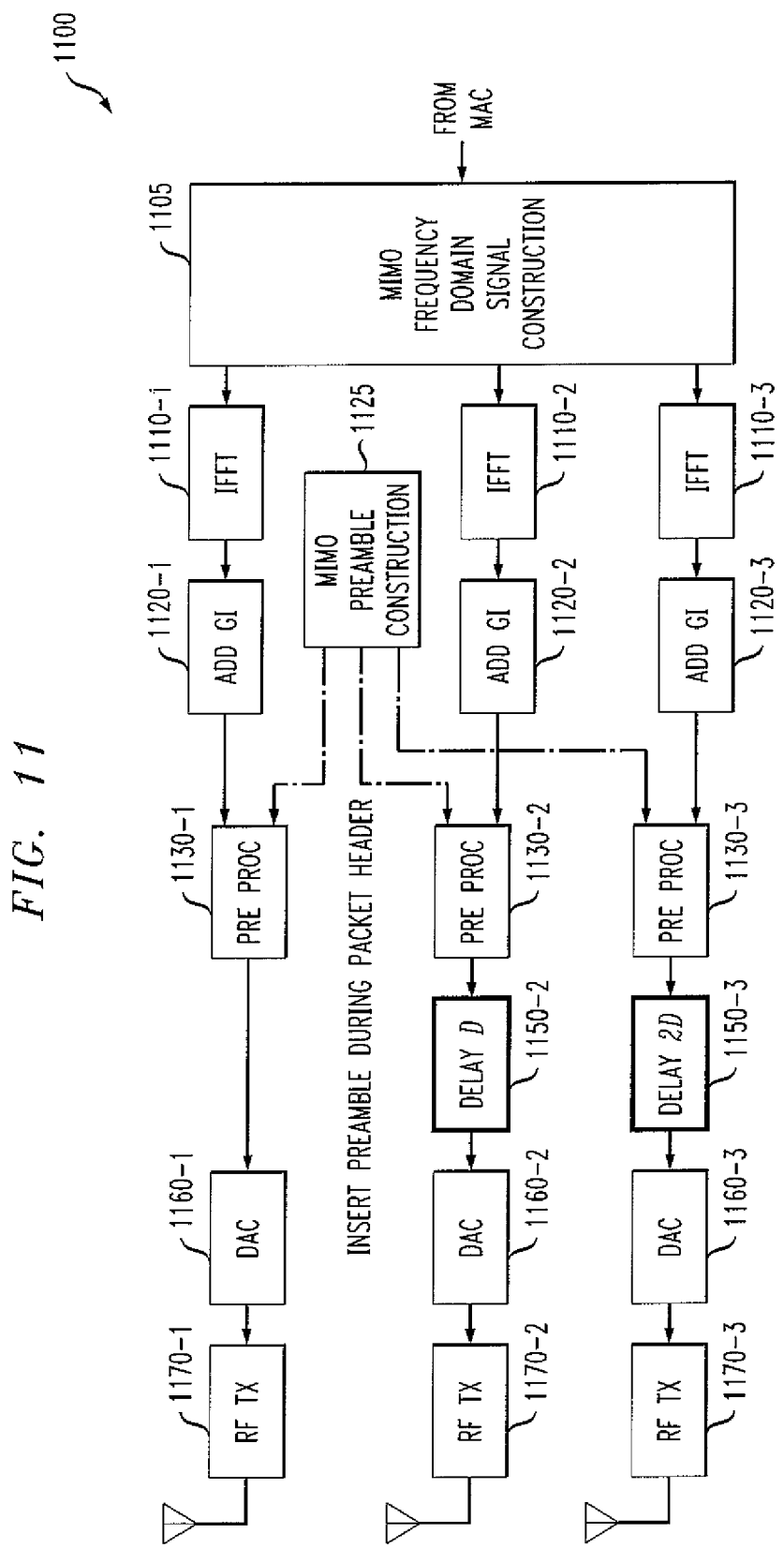
FIG. 11 is a schematic block diagram of a transmitter incorporating features of the present invention for an exemplary multiple antenna communication system having three transmit antennas.

FIG. 11 is a schematic block diagram of a transmitter 1100 incorporating features of the present invention for an exemplary multiple antenna communication system having three transmit antennas. The transmitter 1100 has the same structure as the transmitter 800 of FIG. 8, with the addition of another transmit branch. As shown in FIG. 11, data to be transmitted is received from the MAC layer and the signal is constructed in the frequency domain at stage 1105, such as signal encoding and modulation. Thereafter, an inverse fast Fourier transform is performed at stage 1110 and a guard interval is added at stage 1120. The MIMO preamble is constructed at stage 1125 and combined with the data signal at stage 1130. The frame for the second and third transmitters are delayed in accordance with the present invention at stage 1150. The digital signal is converted to an analog signal at stage 1160 and transmitted at stage 1170.

Thus, delay elements 1150-2 and 1150-3 are introduced at the end of the digital signal processing chain in the second antenna branch TX-2 and third antenna branch TX-3, respectively, before the signal is converted to analog and forwarded to the RF stage. It is important to note that in the exemplary embodiment this delay is applied across the whole packet including all data symbols, i.e., this delay is not limited to the preamble section of the frame. Also note that the channel estimation in the frequency domain has not changed. The individual delays do not necessarily have to be multiples of the same basic delay D.

Figure 12:
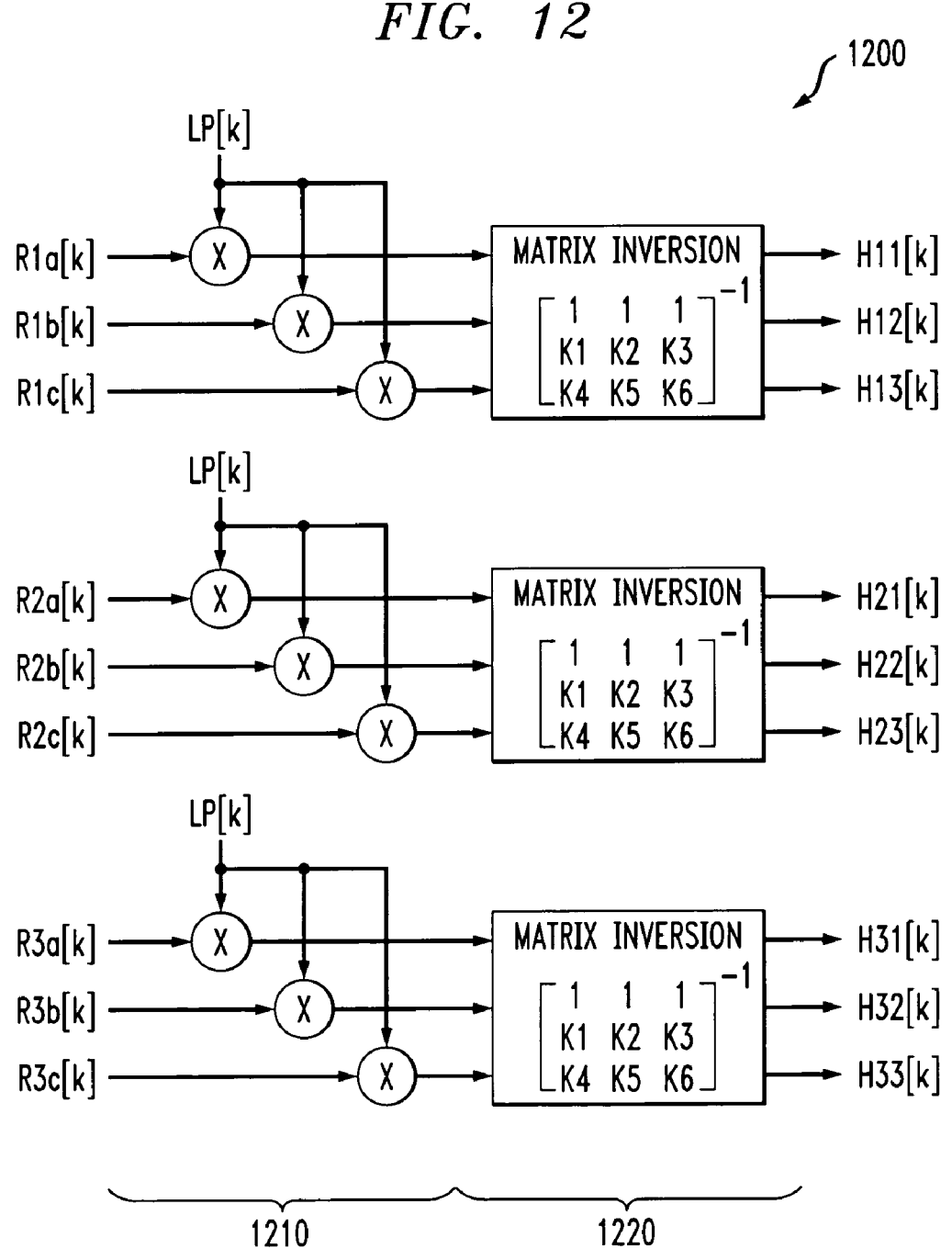
FIG. 12 illustrates a channel estimation structure that produces the channel coefficients for a multiple antenna communication system having three transmit antennas.

FIG. 12 illustrates a channel estimation structure 1200 that produces the channel coefficients for a multiple antenna communication system having three transmit antennas. Thus, the output of the channel estimation structure 1200 is the desired channel coefficients (for an exemplary 3×3 MIMO system). The channel estimation structure 1200 multiplies the received signals R by the corresponding long preamble symbol at stage 1210 and then performs an appropriate matrix inversion at stage 1220, to produce the channel coefficients, H. It is noted that noise contributions would be added to each coefficient, such that the estimate would not be completely identical to the actual coefficient, leading to some degradation.

It is assumed in FIG. 12 that the magnitudes of all long preamble symbols in the frequency domain LP{k} have a unity magnitude, i.e., LP{k} equals +1 or LP{k} equals −1. Thus, for each receive branch 1, 2 or 3 and in each subcarrier k, the outputs from the three preamble segments a, b, c, are premultiplied by LP{k} at stage 1210. Then, a matrix multiplication with the inverse of the K coefficient matrix is carried out at stage 1220, as shown in FIG. 12.

It is further noted generally that, although the K factor in front of the LP preamble transmitted from the first antenna TX-1 is arbitrarily chosen to be 1.0 for all preamble segments, these factors could have different values, too. The selection of 1.0 for the first antenna TX-1 is useful. If K factors other than 1.0 are chosen for the first transmit antenna LP segments, they should appear in the matrix inverse 1220 as well.

In general, the channel estimation scheme shown in FIG. 12 can be applied to multiple antenna communication systems having two or four transmit antennas as well. In the former case, the matrix to be inverted and used for the multiplication would be 2×2 dimensional where the first row has unity values and the second row of the matrix has values of K1 and K2, and the functionality turns out to be identical to the channel estimation scheme shown in FIG. 6. For the four transmit antenna case, the matrix to be inverted would have a first row of all unity values, a second row with values of K1, K2, K3 and K4, a third row with values of K5, K6, K7 and K8; and a fourth row with values of K9, K10, K11 and K12. Again, if the K coefficients linked to the first transmit antenna would be different from 1.0, the first row in these matrices would have to carry the corresponding coefficients.

It should be noted that for the specific example of K parameters used here, the required matrix inverses are very straightforward and essentially given by the K factors (or complex conjugates of them) and possibly a simple overall scaling factor valid for the whole matrix multiplication. This makes the solution straightforward.

Another extension is possible for a system that has a larger number of receive antennas than transmit antennas. Then, the corresponding channel coefficients could easily be estimated by adding another row of processing blocks carrying out a corresponding pre-multiplication with LP{k} and then applying the matrix inverse. For example, for FIG. 12, if there were still three transmit antennas but four receive antennas, a fourth row would be added, combining receive signals R4a, R4b, and R4c, and the coefficients generated after the inverse matrix multiplication would be the desired coefficients H41, H42, and H43. A similar extension would apply to a 2×3 MIMO system.

Figure 13:
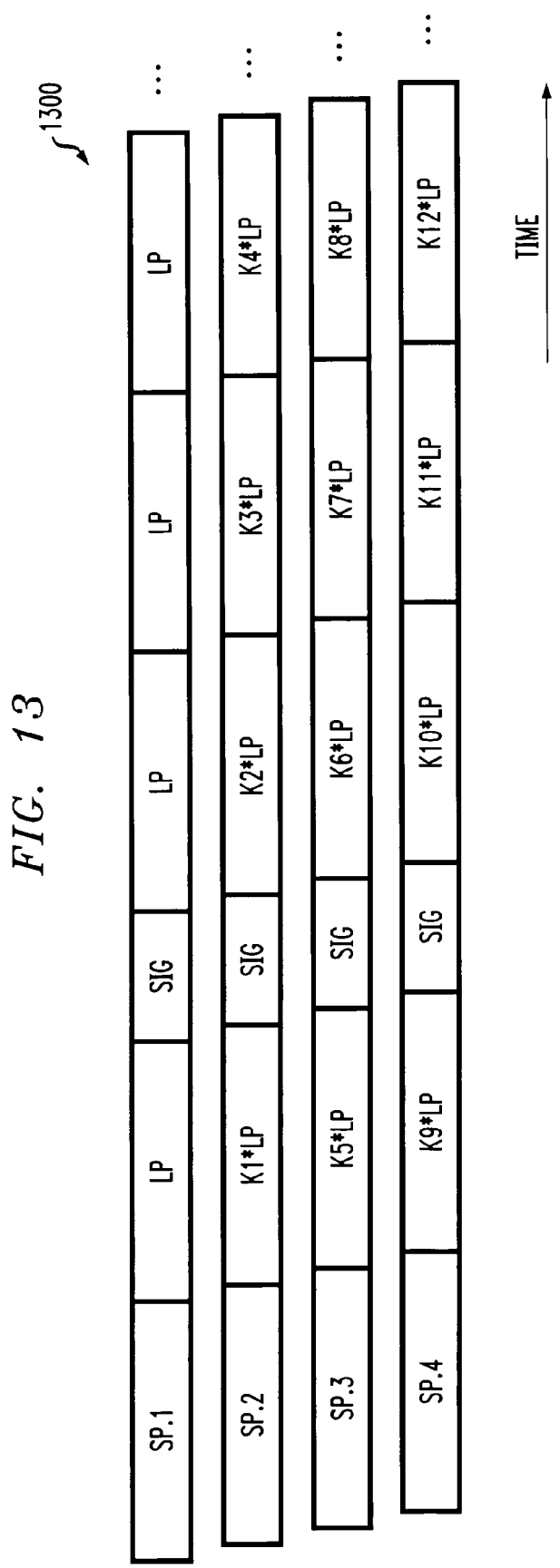
FIG. 13 illustrates a frame format incorporating features of the present invention for an exemplary multiple antenna communication system having four transmit antennas.

FIG. 13 illustrates a frame format 1300 incorporating features of the present invention for an exemplary multiple antenna communication system having four transmit antennas. As shown in FIG. 13, the second antenna TX-2 is delayed from the first antenna TX-1, the third antenna TX-3 is further delayed from the second antenna, and the fourth antenna TX-4 is delayed relative to the third antenna.

Using these parameters, it is ensured that each transmit antenna transmits the same power at any time (magnitude of all Ks is 1.0), and that the receiver can separate the channel coefficients in a multi-dimensional manner. The delay D would typically correspond to T or 0.5 T in this implementation. For example, the K coefficients can have the following exemplary values:

$$K1=K5=K7=K9=1;$$

$$K2=K12=\exp(j*90\ \text{deg})=-j;$$

$$K3=K6=K8=K11=-1;\ \text{and}$$

$$K4=K10=\exp(+j*90\ \text{deg})=+j.$$

The short preambles SP.1 to SP.4 could follow any suitable well-known or MIMO-specific short preamble format. For example, SP.1 to SP.4 could all follow the 802.11 a/g OFDM standard.

The preamble formats discussed above have been based on the use of a single SIGNAL field OFDM symbol after the first Long Preamble segment LPa. This SIGNAL field could be as specified by the IEEE 802.11g/a OFDM standard, i.e., using a 6 Mbps mode under all circumstances. In order for the MIMO receiver to obtain additional information on the high-speed transmission of the data field, a second SIGNAL field may be helpful.

FIGS. 14A and 14B illustrate a frame format 1400, 1450, respectively, where a second signal field SIG2 is found after the first signal field SIG1. FIG. 14A illustrates the 2-Tx MIMO system, where FIG. 14B illustrates the example of the 3-Tx MIMO system. Another alternative would be to have the SIG2 field after the second Long Preamble (not shown in the Figures).

The concrete delay transmission scheme proposed above, such as in FIG. 9, may increase the channel delay spread (in the Preamble). In the 2-Tx MIMO system, such an increase is marginal. However, the delay spread increases as the number of transmitter antennas increases, which would degrade the system performance.

Figure 15:
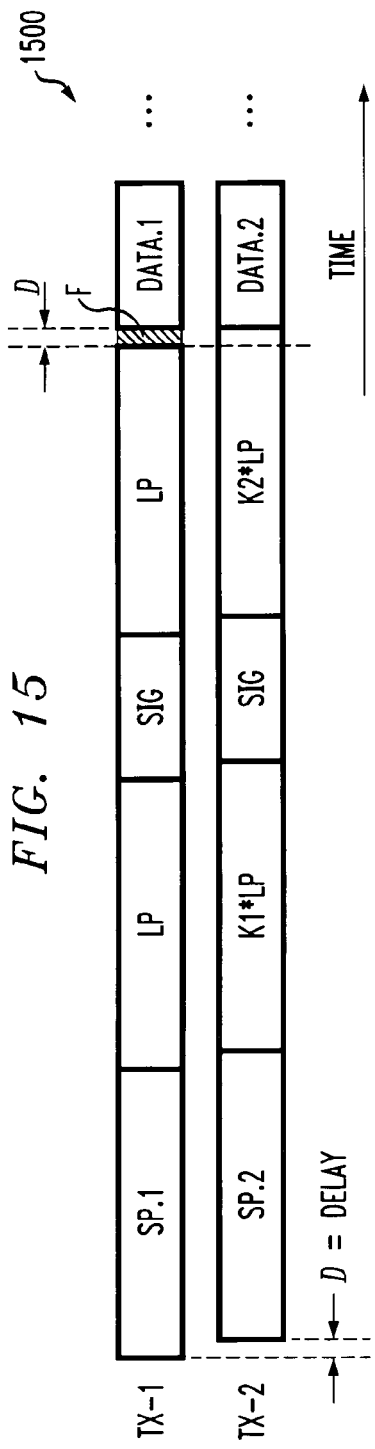
FIG. 15 illustrates a frame format incorporating features of the present invention for an exemplary two transmit branch scheme that only delays the preambles and SIGNAL field but not the data.

FIG. 15 illustrates a frame format 1500 incorporating features of the present invention for an exemplary three transmit branch scheme that only delays the preambles and SIGNAL field but not the data. This way, the data transmission does not suffer from the delay spread increase. After the transmission of the preamble and signal field right before the data transmission, a dummy signal F (silence, or cyclic extension of the Long Preamble, or an arbitrary padding signal) of length D is added to the first transmit stream. Then, the MIMO DATA parts are transmitted simultaneously from both antennas. Note that the MIMO receiver needs to know about this delayed/non-delayed transmission differing between the Preamble parts and the DATA parts, in order to properly adjust the synchronization (timing of each OFDM symbol) and channel estimation.

As shown in FIG. 15, two parameters K1 and K2 are specified (in a similar manner to FIG. 9). The parameters K1 and K2 can generally take any convenient values that allow for a reconstruction (separation) of the channel coefficients using the procedure described above. In the specific implementation shown in FIG. 15, the parameter K1 equals 1 and the parameter K2 equals −1.

Figure 16:
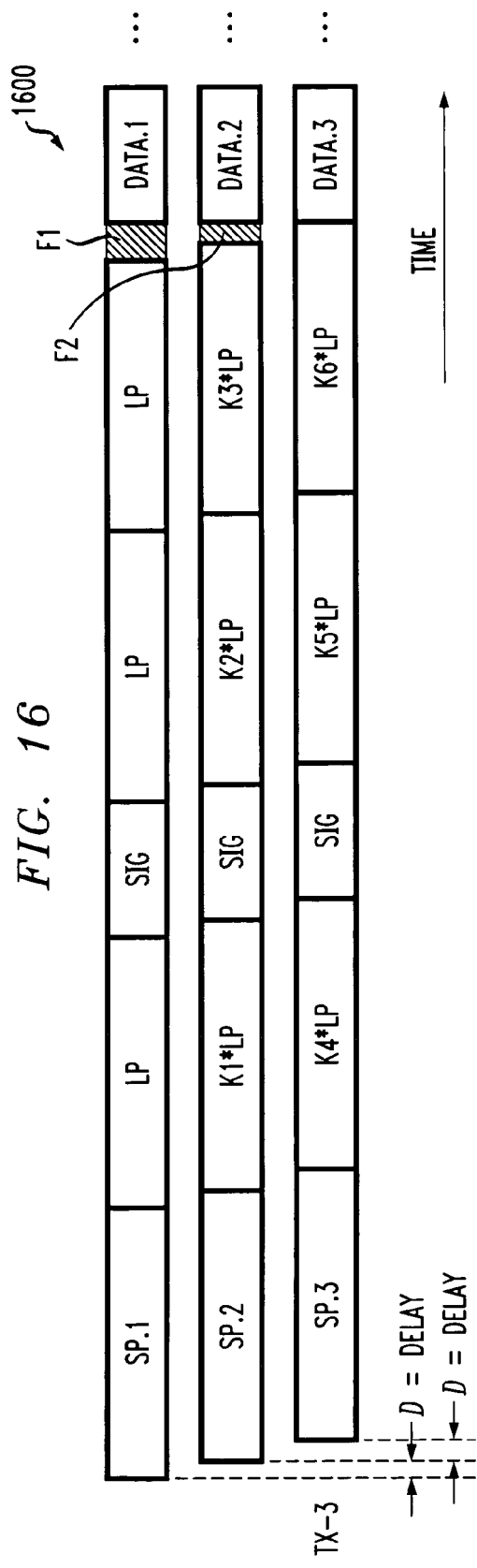
FIG. 16 illustrates a frame format incorporating features of the present invention for an exemplary three transmit branch scheme that only delays the preambles and SIGNAL field but not the data.

FIG. 16 illustrates a frame format 1600 incorporating features of the present invention for an exemplary three transmit branch scheme that only delays the preambles and SIGNAL field but not the data. As shown in FIG. 16, the frame format 1600 uses two dummy periods F1 and F2.

Figure 17:
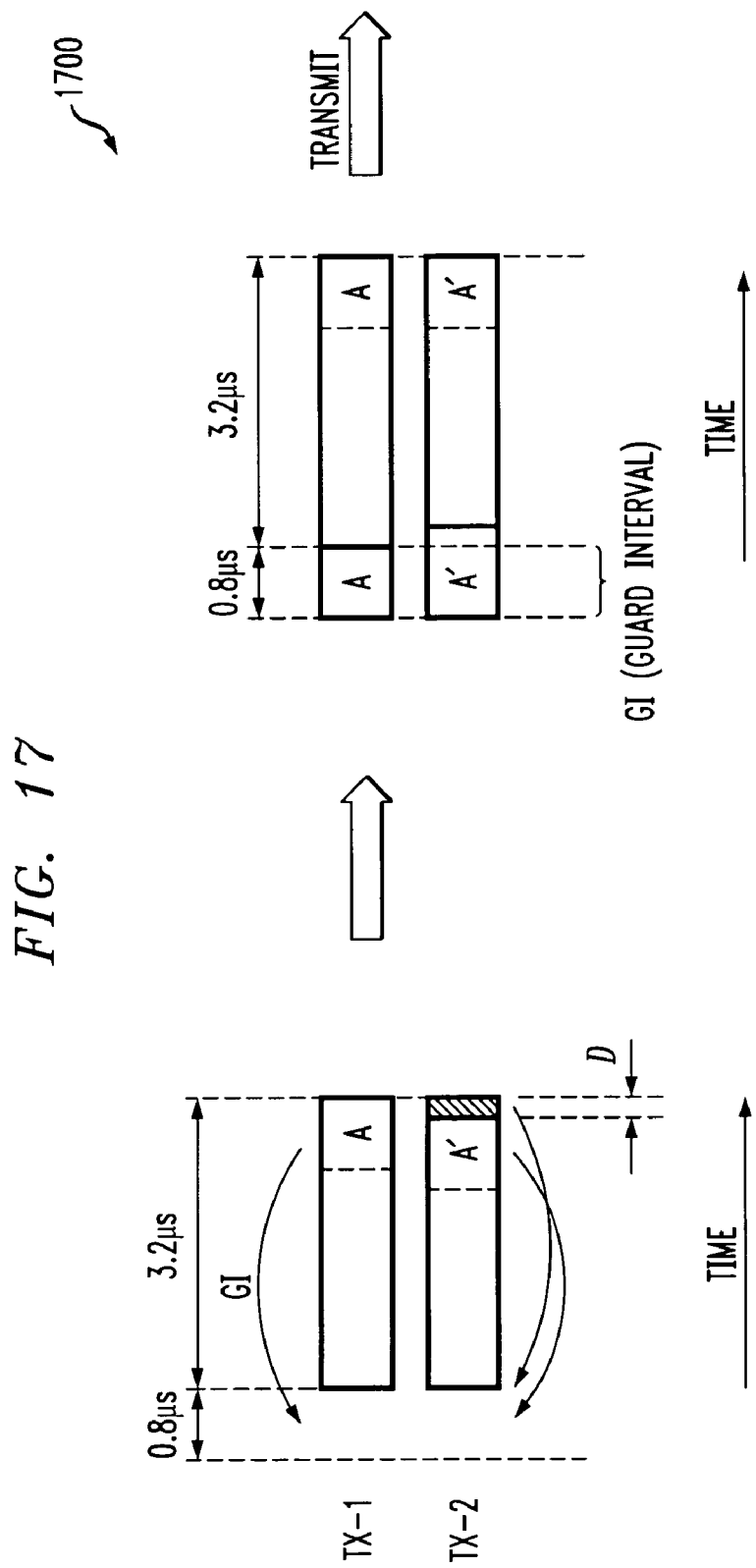
FIG. 17 illustrates an alternate scheme for an exemplary multiple antenna communication system having two transmit branches that overcomes the drawback of the delay spread increase in the physical channel.

FIG. 17 illustrates an alternate scheme 1700 for an exemplary multiple antenna communication system having two transmit branches that overcomes the drawback of the delay spread increase in the physical channel. Rather than delaying the transmission from the second antenna by D, the signal transmitted from the second antenna is cyclically rotated within each symbol (to introduce a rotation delay). In the embodiment of FIG. 17, the samples on the second transmit branch are cyclically shifted and corresponding Guard Intervals (GI) are added on transmit branches Tx-1 and Tx-2. As shown in FIG. 17, such a cyclic rotation can be achieved, for example, by putting the last samples of duration D of one OFDM symbol (still without guard interval, GI) before the rest of the symbol. Then, the guard interval, reusing the last G samples (0.8 microseconds in 802.11a OFDM) from the newly created symbol (shown as A' in FIG. 17), is added. This cyclic rotation is done for all OFDM symbols across the whole packet per OFDM symbol including the preambles.

Note that the Short Preamble in IEEE 802.11a OFDM doesn't have an explicit Guard interval, so there, the cyclic rotation should be taken across all ten Short Preamble symbols that form the Short Preamble, and no GI subsequent addition step is required. Alternatively, it can be carried out individually per each one of the ten Short Training segments (due to periodicity, there is no difference). For the Long Preamble, the rotation should take place per each one of the two Long Training Sequences or across both at the same time, again there is no difference. Then, the (long) GI should be based on the newly constructed Long Training Sequence. Mathematically, in the OFDM context, where signals are eventually translated back into and treated in the frequency domain at the receiver, such a cyclic rotation is equivalent to delaying the signal transmission by D samples. Therefore, the scheme here has the same inherent decorrelation and beam-pattern-avoiding benefit of the delayed transmission scheme discussed above, while all transmissions at the TX antennas start at the same moment, in contrast to the non-cyclic approaches from above.

Figure 18:
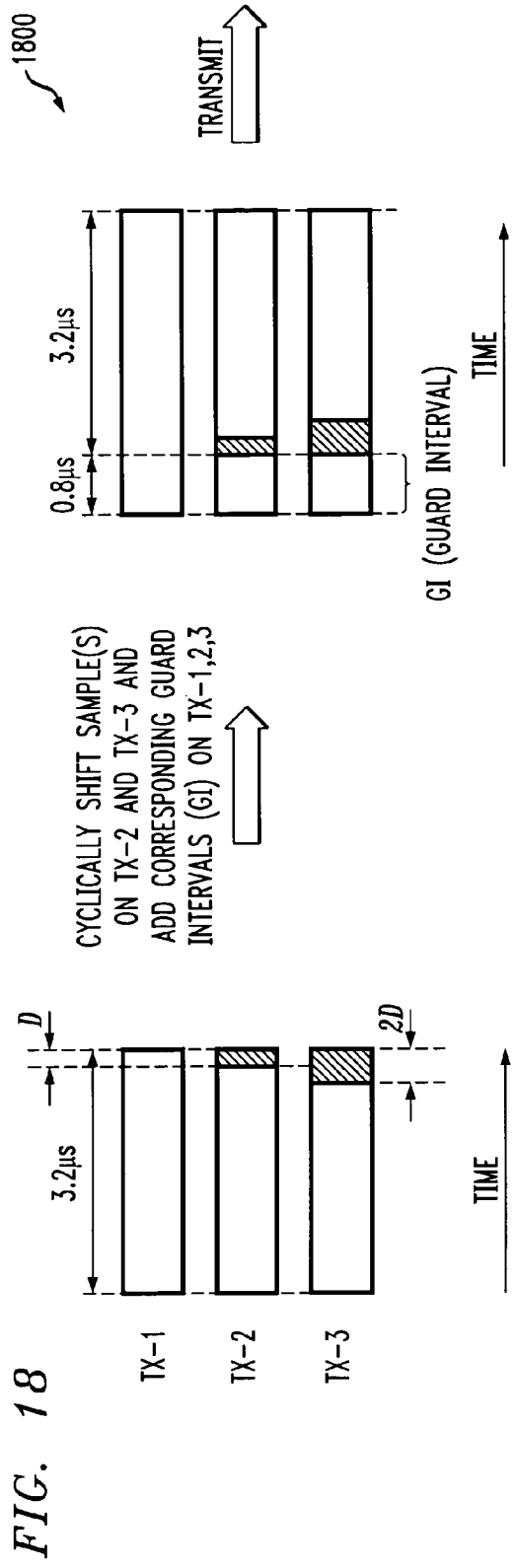
FIG. 18 illustrates an alternate scheme for an exemplary multiple antenna communication system having three transmit branches that overcomes the drawback of the delay spread increase in the physical channel.

FIG. 18 illustrates an alternate scheme 1800 for an exemplary multiple antenna communication system having three transmit branches that overcomes the drawback of the delay spread increase in the physical channel. In the embodiment of FIG. 18, the sample(s) on Tx-2 and Tx-3 are cyclically shifted and corresponding Guard Intervals (GI) are added on transmitters TX-1, TX-2 and TX-3. The third antenna simply performs the same cyclic rotation but with 2D samples. Again, the guard intervals to be prepended are based on the rotated symbols.

Figure 19:
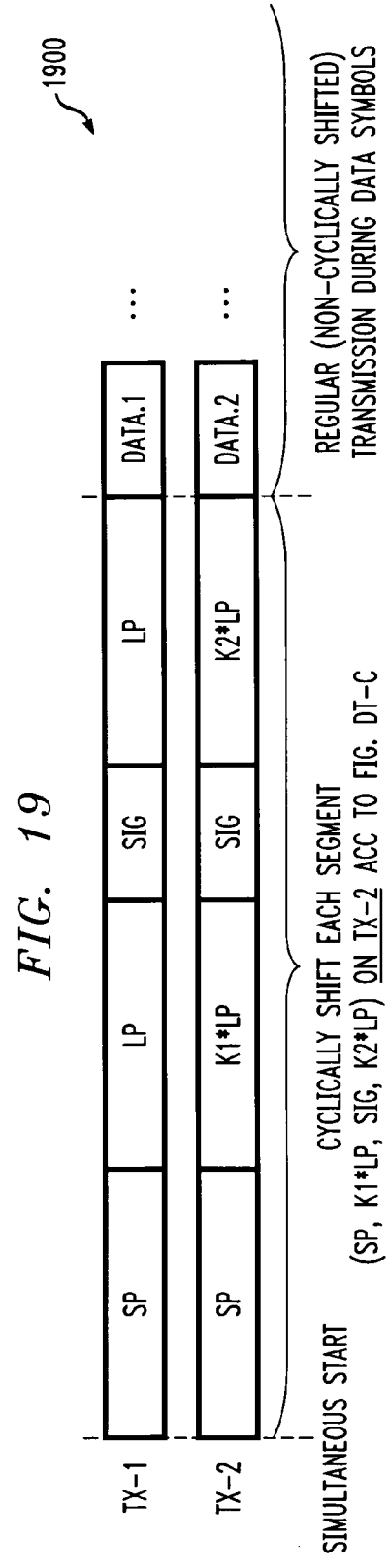
FIG. 19 illustrates a further variation of the present invention where the cyclic rotation is performed only on the short preamble, long preambles and signal field(s).

FIG. 19 illustrates a further variation of the present invention where the cyclic rotation is performed only on the short preamble, long preambles and signal field(s). The data symbols are not cyclically rotated. The scheme reduces the complexity of the transmitter and maintains the benefit of cyclic rotation. In this scheme, the receiver needs to specifically adjust its synchronization and channel estimation procedure to this delayed/non-delayed difference between the Preamble parts and the DATA parts. For the channel estimation, the Lp{k} multipliers in FIGS. 6 and 12 for the second antenna should be Lp{k}exp(−j2πDk/N) (N is the size of FFT), and Lp{k}exp(−j4πDk/N) for the third antenna, again assuming that the magnitude of all Lp{k}'s is either +1 or (−1).

It is to be understood that the embodiments and variations shown and described herein are merely illustrative of the principles of this invention and that various modifications may be implemented by those skilled in the art without departing from the scope and spirit of the invention.

We claim:

1. A transmission method in a multiple antenna communication system having a plurality of transmit antennas, said method comprising the steps of:
   transmitting at least a portion of a frame on a first one of said plurality of transmit antennas; and
   transmitting a delayed version of said at least a portion of said frame on at least a second one of said plurality of transmit antennas, wherein said transmitting steps temporally overlap, wherein said delayed version is obtained by cyclically shifting only a preamble portion of said frame on said at least a second one of said plurality of transmit antennas, and wherein said delay is matched to an auto-correlation function of respective short and long preambles such that an auto-correlation value is substantially low compared to a main peak.

2. The method of claim 1, wherein said delayed version differs from said at least a portion of said frame by a delay amount, D.

3. The method of claim 2, wherein said delay amount D is approximately equal to one OFDM time sample period T.

4. The method of claim 3, wherein said OFDM time sample period T is given by an inverse of a frequency spacing of two adjacent subcarriers, divided by a maximum number of captured OFDM subcarriers.

5. The method of claim 1, wherein said at least a portion of a frame comprises a preamble portion of said frame and a data portion of said frame is time aligned on each of said plurality of transmit antennas.

6. The method of claim 1, further comprising the step of adding a guard interval to said cyclically shifted portion of said frame.

7. The method of claim 1, wherein said at least a portion of said frame is a preamble portion of said frame.

8. The method of claim 7, wherein said preamble portion of said frame can be processed by a single antenna communication system.

9. A transceiver for transmitting a packet in a multiple antenna communication system, said transceiver comprising:
   a first transmit branch for transmitting at least a portion of a frame; and
   a second transmit branch for transmitting a delayed version of said at least a portion of said frame, wherein said transmitting steps temporally overlap, wherein said delayed version is obtained by cyclically shifting only a preamble portion of said frame on said at least a second one of said plurality of transmit antennas, and wherein said delay is matched to an auto-correlation function of respective short and long preambles such that an auto-correlation value is substantially low compared to a main peak.

10. The transceiver of claim 9, wherein said delayed version differs from said at least a portion of said frame by a delay amount, D.

11. The transceiver of claim 10, wherein said delay amount D is approximately equal to one OFDM time sample period T.

12. The transceiver of claim 11, wherein said OFDM time sample period T is given by an inverse of a frequency spacing of two adjacent subcarriers, divided by a maximum number of captured OFDM subcarriers.

13. The transceiver of claim 9, wherein said at least a portion of a frame comprises a preamble portion of said frame and a data portion of said frame is time aligned on each of said plurality of transmit antennas.

14. The transceiver of claim 9, further comprising a step of adding a guard interval to said cyclically shifted at least a portion of said frame.

15. The transceiver of claim 9, wherein said at least a portion of said frame is a preamble portion of said frame.

16. The transceiver of claim 15, wherein said preamble portion of said frame can be processed by a single antenna communication system.

17. A transmission method in a multiple antenna communication system having a plurality of transmit antennas, said method comprising the steps of:
   transmitting at least a portion of a frame on a first one of said plurality of transmit antennas; and
   transmitting a shifted version of said at least a portion of said frame on at least a second one of said plurality of transmit antennas, wherein said transmitting steps temporally overlap, wherein said shifted version is obtained by cyclically shifting only a preamble portion of said frame on said at least a second one of said plurality of transmit antennas, and wherein said shift is matched to an auto-correlation function of respective short and long preambles such that an auto-correlation value is substantially low compared to a main peak.

18. The method of claim 17, wherein said shifted version differs from said at least a portion of said frame by a delay amount, D.

19. The method of claim 17, wherein said shifted version differs from said at least a portion of said frame by cyclically shifting at least a portion of said frame.

* * * * *